(12) United States Patent
Chen et al.

(10) Patent No.: US 7,779,267 B2
(45) Date of Patent: Aug. 17, 2010

(54) METHOD AND APPARATUS FOR USING A SECRET IN A DISTRIBUTED COMPUTING SYSTEM

(75) Inventors: Liqun Chen, Bristol (GB); Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2467 days.

(21) Appl. No.: 09/946,323

(22) Filed: Sep. 4, 2001

(65) Prior Publication Data

US 2003/0046542 A1 Mar. 6, 2003

(51) Int. Cl.
*G06F 12/14* (2006.01)
*G06F 7/04* (2006.01)
*H04L 29/06* (2006.01)
*H04L 9/32* (2006.01)
*G08B 29/00* (2006.01)

(52) U.S. Cl. .................. 713/185; 713/157; 713/159; 713/168; 713/172; 713/173; 713/189; 726/4; 726/7; 726/9; 726/22; 726/34

(58) Field of Classification Search ............... 713/185, 713/153, 172, 200, 157, 159, 168, 173, 189; 726/4, 7, 9, 22, 34
See application file for complete search history.

(56) References Cited

U.S. PATENT DOCUMENTS

| | | | |
|---|---|---|---|
| 4,562,306 A | 12/1985 | Chou et al. ............. 178/22.08 |
| 5,327,497 A | 7/1994 | Mooney et al. ............... 380/25 |
| 5,361,359 A | 11/1994 | Tajalli et al. ................. 395/700 |
| 5,379,344 A | 1/1995 | Larsson et al. ................. 380/23 |
| 5,396,609 A * | 3/1995 | Schmidt et al. ............. 711/163 |
| 5,442,704 A | 8/1995 | Holtey .......................... 380/23 |
| 5,485,519 A * | 1/1996 | Weiss .......................... 713/185 |
| 5,544,246 A | 8/1996 | Mandelbaum et al. ........ 380/23 |
| 5,666,412 A | 9/1997 | Handelman et al. ........... 380/4 |

(Continued)

FOREIGN PATENT DOCUMENTS

EP 0 379 333 A1 7/1990

(Continued)

OTHER PUBLICATIONS

Abstract of Netherlands Patent NL 9101506, published Apr. 1, 1993.

(Continued)

*Primary Examiner*—Aravind K Moorthy

(57) ABSTRACT

There are many times when a secret needs to be used in a distributed computing system—these are often held in security tokens, such as smart cards. It may be desirable for another device, such as a computer platform, to act in place of the security token as the repository of a secret, particularly for operations within a distributed computing system. Within the distributed computing system there is located a trusted entity, physically and logically resistant to unauthorized modification—this may be a trusted device located within a specific computing platform. This contains validation information which can be communicated to the security token. The security token then carries out a validation process on this validation information—if successful, the security token then provides a secret to the trusted device for use within the distributed computing system. The trusted device may be required to use this secret only for a specified period of time, or for a specific purpose or task.

48 Claims, 9 Drawing Sheets

U.S. PATENT DOCUMENTS

| | | | |
|---|---|---|---|
| 5,721,781 A * | 2/1998 | Deo et al. | 705/67 |
| 5,761,309 A * | 6/1998 | Ohashi et al. | 713/156 |
| 5,768,382 A | 6/1998 | Schneier et al. | 380/23 |
| 5,778,072 A | 7/1998 | Samar | 380/30 |
| 5,822,431 A * | 10/1998 | Sprunk | 713/150 |
| 5,864,624 A | 1/1999 | Lukas et al. | 380/25 |
| 5,872,849 A * | 2/1999 | Sudia | 713/175 |
| 5,917,168 A | 6/1999 | Nakamura et al. | 235/379 |
| 5,923,759 A | 7/1999 | Lee | 380/25 |
| 6,018,717 A * | 1/2000 | Lee et al. | 705/13 |
| 6,058,193 A * | 5/2000 | Cordery et al. | 380/284 |
| 6,138,239 A * | 10/2000 | Veil | 713/200 |
| 6,173,400 B1 | 1/2001 | Perlman et al. | 713/172 |
| 6,189,098 B1 * | 2/2001 | Kaliski, Jr. | 713/168 |
| 6,212,635 B1 | 4/2001 | Reardon | 713/165 |
| 6,226,744 B1 * | 5/2001 | Murphy et al. | 726/5 |
| 6,230,266 B1 * | 5/2001 | Perlman et al. | 713/158 |
| 6,233,687 B1 * | 5/2001 | White | 713/201 |
| 6,246,771 B1 * | 6/2001 | Stanton et al. | 380/286 |
| 6,298,441 B1 | 10/2001 | Handelman et al. | 713/185 |
| 6,311,272 B1 * | 10/2001 | Gressel | 713/186 |
| 6,330,670 B1 | 12/2001 | England et al. | 713/2 |
| 6,381,696 B1 * | 4/2002 | Doyle | 713/156 |
| 6,405,369 B1 | 6/2002 | Tsuria | 725/6 |
| 6,490,680 B1 * | 12/2002 | Scheidt et al. | 713/166 |
| 6,527,187 B1 * | 3/2003 | Nagata et al. | 235/475 |
| 6,738,901 B1 * | 5/2004 | Boyles et al. | 713/159 |
| 7,302,585 B1 * | 11/2007 | Proudler et al. | 713/189 |
| 2001/0054148 A1 * | 12/2001 | Hoornaert et al. | 713/172 |
| 2002/0023032 A1 * | 2/2002 | Pearson et al. | 705/35 |
| 2002/0112156 A1 * | 8/2002 | Gien et al. | 713/156 |

FOREIGN PATENT DOCUMENTS

| | | |
|---|---|---|
| EP | 0 421 409 A2 | 4/1991 |
| EP | 0 522 392 B1 | 7/1993 |
| EP | 0 848 315 A2 | 6/1998 |
| EP | 0 992 958 A2 | 4/2000 |
| EP | 1 081 891 A2 | 3/2001 |
| GB | 2 317 038 | 3/1998 |
| GB | 2 317 983 | 4/1998 |
| GB | 2 320 597 | 6/1998 |
| WO | 93/24906 | 12/1993 |
| WO | 95/24696 | 9/1995 |
| WO | 97/29416 | 8/1997 |
| WO | 98/55912 | 12/1998 |

OTHER PUBLICATIONS

Ferreira, R., "The Practical Application of State of the Art Security in Real Environments," *Proceedings of the International Conference on Cryptology, Auscrypt*, pp. 334-355 (Jan. 1990).

Verschuren, T., "Smart access: strong authentication on the Web," *Computer Networks and ISDN Systems*, vol. 30, No. 16-18, pp. 1511-1519 (Sep. 30, 1998).

Anderson, R. and Markus Kuhn, "Tamper Resistance—a Cautionary Note," 16 pages, located at Internet address <www.cl.cam.ac.uk/~mgk25/tamper.html> (1996).

Anderson, R. and Markus Kuhn, "Tamper Resistance—a Cautionary Note," *Proceedings of the Second USENIX Workshop on Electronic Commerce*, Oakland CA, pp. 1-11 (Nov. 1996).

Balacheff, B., et al., "Smartcards—From Security Tokens to Intelligent Adjuncts," *CARDIS 1998 Proceedings*, pp. 71-84 (Sep. 1998).

Chaum, D., "Security Without Identification: Transaction Systems to Make Big Brother Obsolete," *Communications of the ACM*, vol. 28, No. 10, pp. 1030-1044 (Oct. 1985).

Intel, "for Management Baseline specification v2.0," *Boot Integrity Services Application Programming Interface Version 1.0*, 64 pages (Dec. 28, 1998).

"Information technology-Security techniques-Entity Authentication—Part 3: Mechanisms using digital signature techniques," *ISO/IEC 9798-3*, 6 pages (1998).

"Information technology-Security techniques-Key management—Part 3: Mechanisms using asymmetric techniques," *ISO/IEC 11770-3*, pp. 1-23 and Annexes A-D (1999).

Thomasson, J.-P. and L. Baldi, "Smartcards: Portable Security," *2nd Annual IEEE International Conference on Innovation Systems in Silicon*, pp. 259-265 (Oct. 1997).

The Trusted Computing Platform Alliance, "Building a Foundation of Trust in the PC,", 9 pages, located at Internet address <www.trustedpc.org/home/home.html> (Jan. 2000).

Trusted Computing Platform Alliance, Main Specification Version 1.0, 284 pages (Jan. 25, 2001).

Woo, T.Y.C. and S.S. Lam, "Authentication for Distributed Systems," *Computer*, vol. 25, No. 1, pp. 39-52 (Jan. 1992).

Yee, B., "Using Secure Coprocessors," Doctoral thesis—Carnegie Mellon University, pp. 1-94 (May 1994).

U.S. Appl. No. 09/936,131, filed Sep. 4, 2001, Chen et al.

U.S. Appl. No. 09/936,132, filed Sep. 4, 2001, Chen et al.

Rankl, W., et al., *Handbuch der Chipkarten*, Carl Hanser Verlag Müchen Wien, pp. 346-349 (1996).

\* cited by examiner

US 7,779,267 B2

METHOD AND APPARATUS FOR USING A SECRET IN A DISTRIBUTED COMPUTING SYSTEM

CROSS REFERENCE TO RELATED APPLICATIONS

The subject matter of the present application may also be related to the following U.S. patent applications: "Smartcard User Interface for Trusted Computing Platform," Ser. No. 09/936,131, filed Sep. 4, 2001; and "Computing Apparatus and Methods Using Secure Authentication Arrangements," Ser. No. 09/936,132, filed Sep. 4, 2001.

1. Field of the Invention

The invention relates to the use of secrets in distributed computing systems. It has particular relevance to use of security tokens, for example smart cards, within distributed computing systems, and in particular to methods and apparatus for effective use of secrets retained within or provided by such security tokens.

2. Background Art

Security tokens, particularly smart cards, have been proposed as a particularly effective way of representing a particular user on a distributed electronic network. A security token may be considered to be a device containing an identity or a credential of a user, the security token being capable of physical control by the user—advantageously, it will be a portable device (such as a smart card). Use of such a smart card simply to identify a user is well known and relatively straightforward (British Patent Application No. 2317038 is one of many examples of such a system).

Use of such smart cards may not only assure entities of the distributed electronic network that an alleged user is who he or she says he is, but also may assure the user that hardware and services are performing as intended or as advertised. Use of a user smart card can be effectively combined with use of a trusted device wit a computing platform. A trusted device, designed to be both physically and logically protected against unauthorized modification, can be used to obtain all integrity metric of a computing platform and thereby confirm to a user that the computing platform is operating as intended (this process is discussed in the applicant's International Patent Application Publication No. WO 00/48063). Use of such a trusted device is at the heart of the Trusted Computing Platform Alliance (www.trustedpc.org) proposals for trusted computing interaction of a trusted device with multiple user smartcards is discussed in the aplicant's International Patent Application Publication No. WO 00/54125, and obtaining permission from a user smartcard for platform operations is discussed in the apphcait's International Patent Application Publication No. WO 00/54126.

The arrangements shown in WO 00/54125 and WO 00/54126 do indicate how user smart cards can be used for more complex process steps than simple user identification or authentication. There are, however, processes in which use of a user smart card and a rusted device within a distributed computing system can prove relatively inefficient. One example is that of a transaction with a remote server—this may require multiple communications with a smart card in a single transaction, which can be slow, either because of the additional number of "legs" of communication required or because (as will usually be the case) the smart card processor is significantly slower than the device processor. Another example is that of a transaction or other process involving multiple smart cards—WO 00/54125 does indicate one way in which this may be achieved (by specifying that the user smart card may be removed for some length of time to be replaced by a specified auxiliary smart card), but this process may in some circumstances be time-consuming and inefficient.

SUMMARY OF THE INVENTION

In a first aspect, the invention provides a computing system comprising a token reader, a trusted device which is physically and logically protected from unauthorized modification, the trusted device having therein a device memory and a device interface adapted for communication with the token reader, and a security token having therein a token processor and a token memory, wherein validation information is stored in the device memory and a secret is stored in the token memory, and whereby on provision of validation information from the device memory to the token memory, and satisfactory completion of a validation process by the token processor, the security token is adapted to provide the secret to the device memory.

By providing the or a secret to the trusted device in this way, various processes (such as transactions involving a remote server, or processes involving multiple smart cards) can be achieved much more effectively. Preferably, the trusted device acts as a proxy for the security token (typically a smart card). The trusted device may be required to use the secret only for a specific time, or a specific task or purpose—this may even be built into the secret provided to the trusted device (for example, if the security token has a private key and is adapted to generate a session key pair, the secret provided to the trusted device may be a session key pair signed with the private key, the security token also generating a certificate indicating the time or purpose for which the session key pair is valid).

It is particularly appropriate for the trusted device to be of the type described by the Trusted Computing Platform Alliance in the TCPA specification obtainable from www.trustedpc.org. Such a trusted device is typically located within a computing platform and is adapted to determine a integrity metric of that computing platform. The trusted device will generally have an identity that advantageously forms all or part of the validation information. The integrity metric may also form part, or even all, of the validation information. Mutual authentication between the trusted device and the security token may be required.

In a second aspect, the invention comprises a method of using in a distributed computing system a secret stored on a security token, the method comprising: the security token obtaining validation information from a trusted entity within the distributed computing system, the dusted entity being logically and physically protected from unauthorized modification; the security token executing a validation process on the validation information, wherein if said validation process is successful; the security token provides the secret to the trusted entity for use within the distributed computing system.

The trusted entity may be a trusted device as indicated above. However, a trusted entity may also be a rusted process—typically this process will be logically protected from other processes mining on the same or related hardware, but the hardware in which the process runs will itself be physically protected from unauthorized modification.

In a third aspect, the invention comprises a computing apparatus acted for temporary use of a received secret, comprising: a computing environment comprising a main processor and a main memory, a trusted entity physically and logically protected from unauthorized modification, the trusted device being adapted to determine an integrity metric of the computing environment; and a token reader in communication with the trusted entity, wherein the trusted entity is adapted to communicate with a security token trough the token reader, to provide the integrity metric to the security token, to receive a secret from the security token, and to use the secret as prescribed by the security token.

In a fourth aspect, the invention provides a computing system comprising: a first trusted entity which is physically and logically protected from unauthorized modification; a second trusted entity which is physically and logically protected from unauthorized modification; a communications channel between the first dusted entity and the second trusted entity; wherein validation information is held by the fiat trusted entity and a secret is held by the second trusted entity, and whereby on provision of validation information from the first trusted entity to the second trusted entity, and satisfactory completion of a validation process by the second trusted entity, the second trusted entity is adapted to provide the secret to the first trusted entity.

The first trusted entity (which may be a trusted device or a trusted process) can thereby act as a proxy for a second trusted entity (which may again be a trusted device or a trusted process). The first trusted entity may be, for example, a trusted device or process in a trusted server, and the second trusted entity the trusted device or process in a trusted user platform.

In a fifth aspect, the invention provides a method of using a secret in a distributed computing system, the method comprising a first trusted entity wit the distributed computing system providing validation information to a second trusted entity within the distributed computing system, each said trusted entity being logically and physically protected from unauthorized modification; the second trusted entity executing a validation process on the validation information, wherein if said validation process is successful; the second trusted entity provides the secret to the first trusted entity for use within the distributed computing system).

BRIEF DESCRIPTION OF THE DRAWINGS

Preferred embodiments of the invention will now be described, by way of example, with reference to the accompanying drawings, of which.

SPECIFIC EMBODIMENTS OF THE INVENTION

Figure 1:
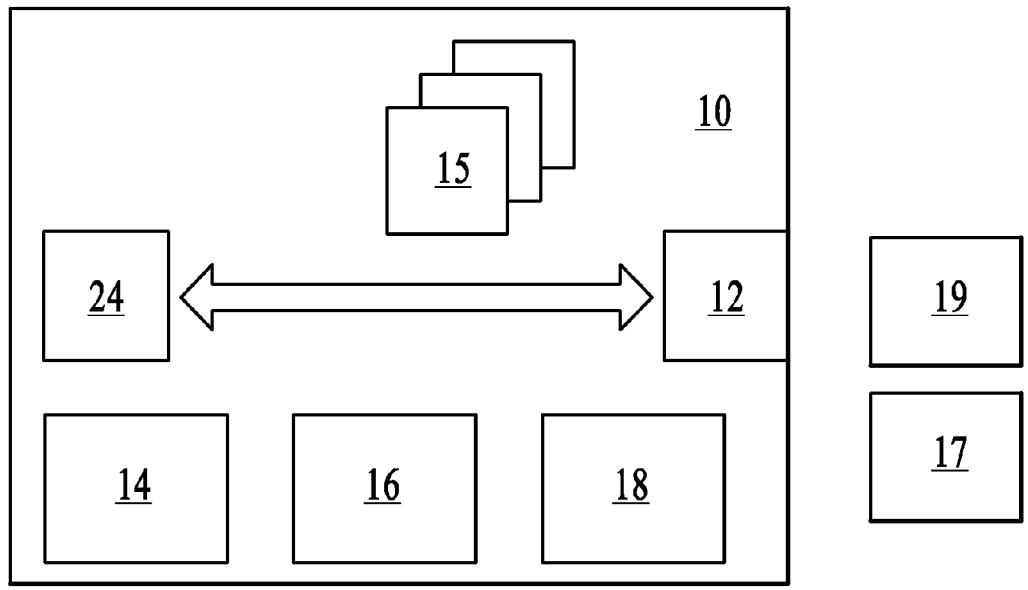
FIG. 1 is a diagram that illustrates a system capable of implementing embodiments of the present invention.

Preferred embodiments of the invention employ a trusted device of the general type described in the applicant's International Patent Application Publication No. WO 00/48063, the contents of which are incorporated by reference herein. The nature of a trusted platform incorporating such a tusked device and its operation are described below.

A "trusted platform" will now be described. This is achieved by the incorporation into a computing platform of a physical trusted device (the trusted device) whose function is to bind the identity of the platform to reliably measured data that provides an integrity metric of the platform. The identity and the integrity metric are compared with expected values provided by a tasted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verity correct operation of the platform.) The user receives the proof of identity and the identity metric, and compares them against values which it believes to be true. Those proper values are provided by the TP or another entity that is tusked by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application rung on the platform. For a remote user, the exchange might involve a secure transaction. In either case, the data exchanged is 'signed' by the tusked device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorized modification. Since tamper-proofing is impossible, the best approximation is a trusted device that is tamper-resistant, or taper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the tusked device), methods for detecting tampering (such as detection of out of specification voltages, X-rays, or loss of physical integrity in the trusted device casing), and methods for eliminating data when tampering is detected. Further discussion if appropriate techniques can be found in "Tamper Resistance—a Cautionary Note", by Ross Anderson and Markus Kuhn, published in the Second USENIX Workshop on Electronic Commerce Proceedings, Oakland, Calif., November 1996, pp 1-11, ISBN 1-880446-83-9. It will be appreciated that, although tamper-proofing is a most desirable feature of the trusted device, it is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

In alternative arrangements, the trusted entity may not be a physical trusted device 24 at all. Instead, it may be a tusked process protected from a surrounding computing environment (for example a Java sandbox in which a Java Virtual Machine operates) —such an arrangement may be termed a compartment, Java Virtual Machines and the handling of security within Java are described at the Sun Microsystems Java web site (http://java.sun.com, particularly http://java.sun.com/security). To implement sandboxes, a Java platform relies on three major components: the class loader, the bytecode verifier, and the security manager. Each component plays a key role in maintaining the integrity of the system. Together, these components ensure that: only the correct classes are loaded; the classes are in the correct format; untrusted classes will not execute dangerous instructions; and untrusted classes are not allowed to access protected system resources. Each component is described further in, for example, the white paper entitled "Secure Computing with Java™. Now and the Future" or in the Java Development Kit 1.1.X (both obtainable from Sun Microsystems, for example at http://java.sun.com). An example of the use of Java Virtual Machines in a compartmental environment is provided by HP Praesidium VirtualVault (basic details of HP Praesidium VirtualVault are described at http://www.hp.com/securtiy/products/virtualvault/papers/brief_4.0/). In such an arrangement, it is preferable for the relevant computing environment as a whole to be protected against physical modification (for example, by being provided in a tamper-resistant physical shell).

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms, but is employed in embodiments of the present invention (an alternative form of token reader could be used for an alternative form of security token, such as an RP tag). Alongside the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform (the functional significance of such elements is not relevant to the present invention and will not be discussed further herein).

Figure 2:
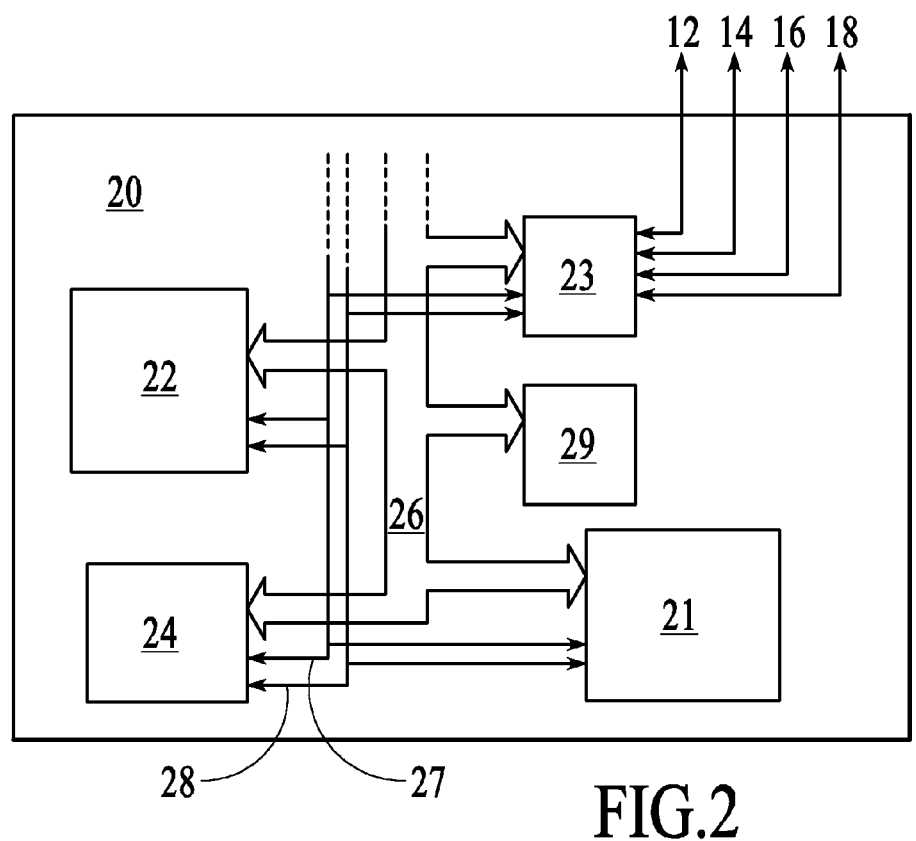
FIG. 2 is a diagram which illustrates a motherboard within the system of FIG. 1 including a trusted device arranged to communicate with a smart card via a smart card reader and with a group of modules.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. The main memory 22 is typically random access memory (RAM). In operation, the platform 10 loads the opera system, for example Windows NT™, into RAM from bard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (address FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT (™), which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the rusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a mater of design choice. However, where the trusted device is separable, a mechanism for providing a logical binding between the trusted device and the platform should be preset.

Figure 3:
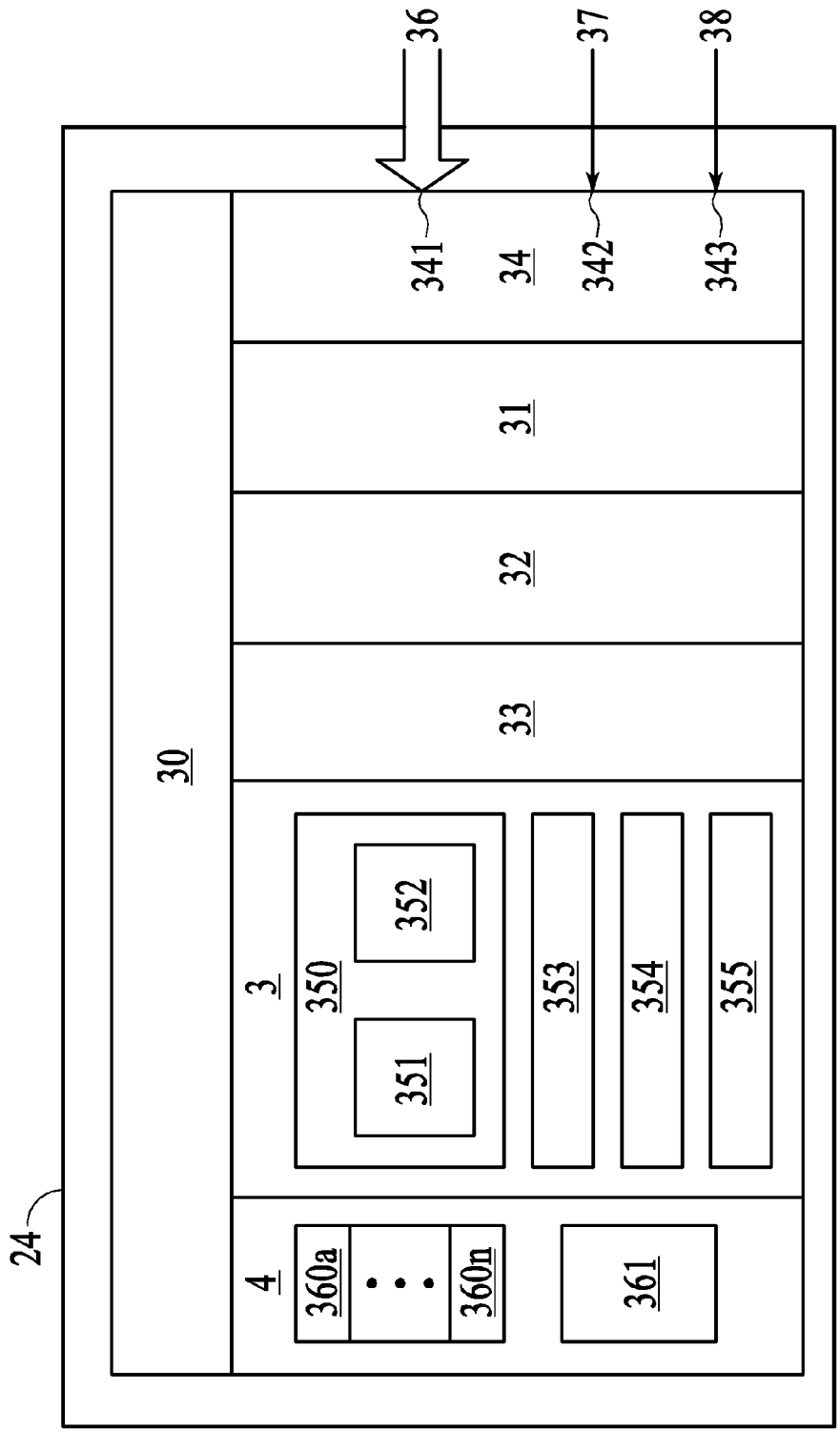
FIG. 3 is a diagram that illustrates the trusted device in more detail.

The tasted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity medic of the computing platform 10. The trusted device 24 can also perform secure data transfer arid, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a rusted part (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program level. Other known processes, for example virus checkers, will typically be in place to check that the operating system and application program code has not been subverted.

The measurement function 31 has access to: non-volatile memory 3 for storing a hash program 354 and a private key 355 of the tested device 24, and volatile memory 4 for storing acquired integrity metric in the form of a digest 361. In appropriate embodiments, the volatile memory 4 may also be used to store the public keys and associated ID labels 360a-360n of one or more authentic smart cards 19s that can be used to gain access to the platform 10.

The process of measurement of an integrity metric is not central to the present invention and is not her discussed here—reference should be made to WO 00/48063. There are a number of different ways in which the integrity metric may be calculated, depending upon the scope of the trust required. The integrity metric should be of such a form that it will enable reasoning about the validity of the boot process—the value of the integrity metric can be used to verify whether the platform booted using the correct BIOS. Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. The integrity metric may be calculated by the trusted device 24 itself, or in alternative arrangements calculated by the main processor of the trusted platform.

Figure 4:
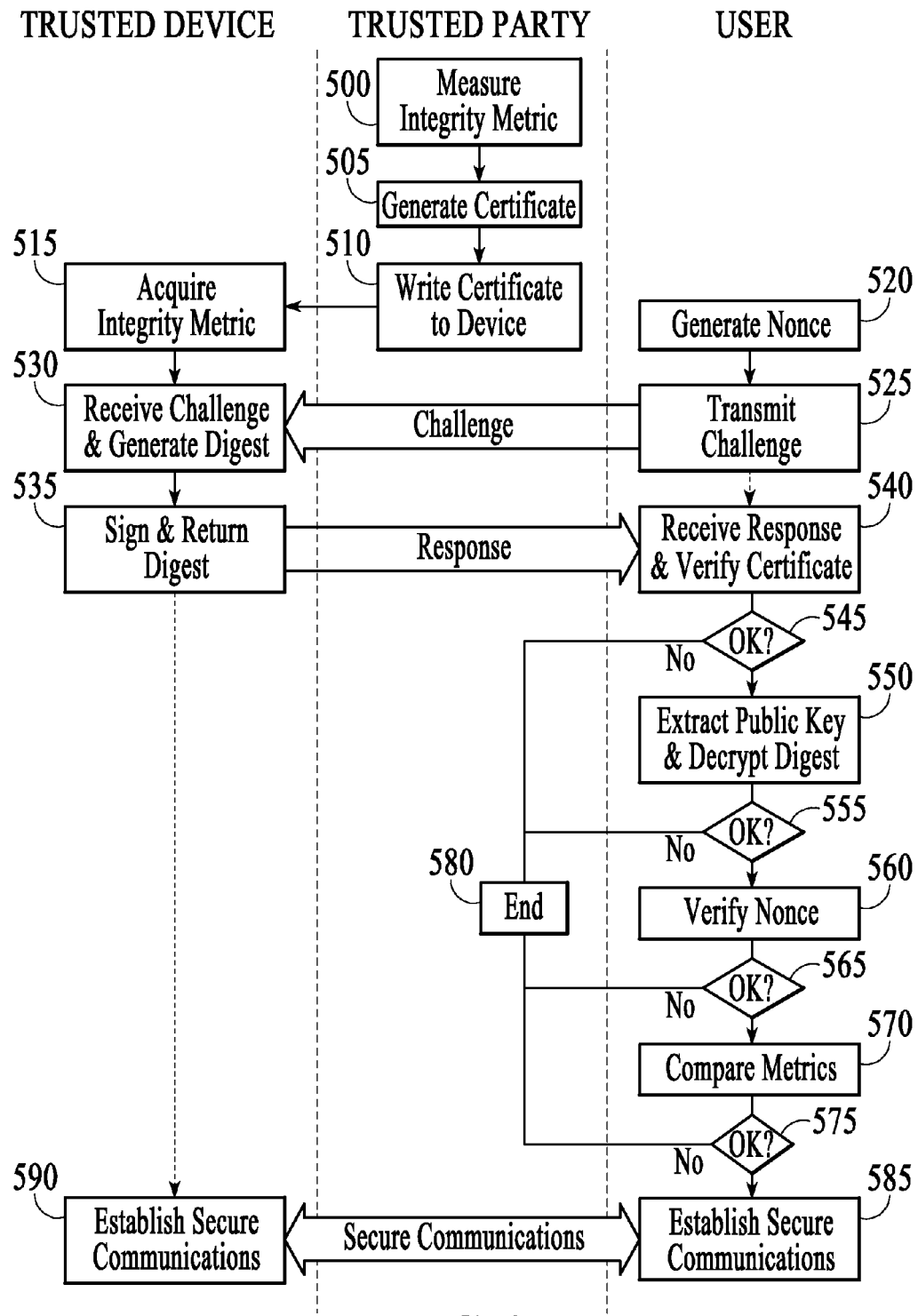
FIG. 4 is a flow diagram that illustrates the steps involved in establishing trusted communication between the trusted device and another computing entity.

FIG. 4 illustrates the flow of actions by a TP, the trusted device 24 incorporated into a platform, and a user who wants to vow the integrity of the platform. It will be appreciated that substantially the same steps as are depicted in FIG. 4 are involved when the user is a local user or a remote user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated tat, for a high level of integrity, the software application would reside on a smart card of the user, who would insert the smart card into an appropriate reader for the purpose of verification.

At the first instance, a TP, which vouches for trusted platforms, will inspect the type of the platform to decide whether to vouch for it or not. This will be a matter of policy. If all is well, in step 500, the TP measures the value of integrity metric of the platform. Then, the TP generates a certificate, in step 505, for the platform. The certificate is generated by the TP by appending the trusted devce's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in is case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the basted device or the user.

In step 510, the trusted device 24 is initialised by writing the certificate 350 into the appropriate nonvolatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the rusted device (or smart card) during manufacture, and used to enable the writing of data to the trusted device 24; writing of data to the trusted device 24 without knowledge of the master key is not possible.

At some later point during operation of the platform for example when it is switched on or reset, in step 515, the rusted device 24 acquires and stores the integrity metric 361 of the platform.

When a user wishes to communicate with the platform, in step 520, he creates a nonce, such as a random number, and, in step 525, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 530, the trusted device 24 receives the challenge and creates an appropriate response. This may be a digest of the measured integrity metric and the nonce, and optionally its ID label. Then, in step 535, the trusted device 24 signs the digest, using its private key, and returns the signed digest, accompanied by the certificate 350, to the user.

In step 540, the user receives the challenge response and verifies the certificate using the well known public key of the TP. The user then, in step 550, extracts the trusted device's 24 public key from the certificate and uses it to decrypt the signed digest from the challenge response. Then, in step 560, the user verifies the nonce inside the challenge response. Next, in step 570, the user compares the computed integrity metric, which it extracts from the challenge response, with the proper platform integrity metric, which it extracts from the certificate. If any of the foregoing verification steps fails, in a steps 545, 555, 565 or 575, the whole process ends in step 580 with no further communications tang place.

Assuming all is well, in steps 585 and 590, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 5:
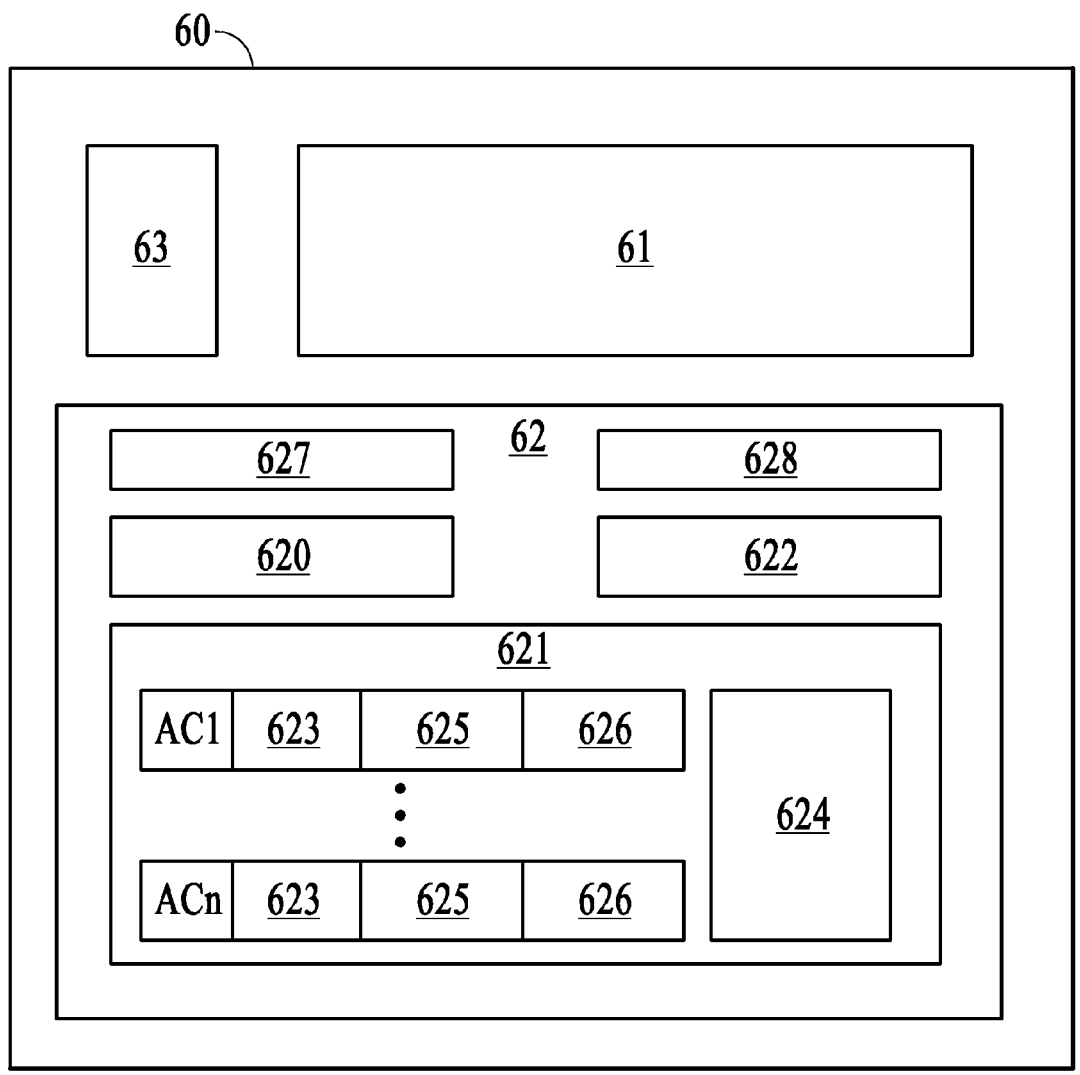
FIG. 5 is a diagram that illustrates the operational parts of a smart card adapted for use as a security token in embodiments of the present invention.

A processing part 60 of a logon smart card 19 is illustrated in FIG. 5. As shown, the logon smart card 19 processing part 60 has the standard features of a processor 61, memory 62 and interface contacts 63. The processor 61 is programmed for simple challenge/response operations involving authentication of the logon smart card 19 and verification of the platform 10, as will be described below. The memory 62 contains its private key 620, its public key 628, a user profile 621, the public key 622 of the TP and an identity 627. The user profile 621 lists the allowable auxiliary smartcards 17 AC1-ACn usable by the user, and the individual security policy 624 for the user. For each auxiliary smart card 17, the user profile includes respective identification information 623, the trust structure 625 between the smart cards (if one exists) and, optionally, the type or make 626 of the smart card. Use of a user profile (and hence of a security policy 624 or trust structures 625) is not necessary in all embodiment of the invention, but is advantageous where multiple smart cards may be required in a process.

In the user profile 621, each auxiliary smart card 17 entry AC1-ACn includes associated identification information 623, which varies in dependence upon the type of card. For example, identification information for a cash card (containing credits which can be debited in a transaction) typically includes a simple serial number, whereas, for a crypto card (with cryptographic functionality and associated with a privilege not transferable to another user), the identification information typically comprises the public key (or certificate) of the crypto card (the private key being stored secretly on the crypto card itself).

The 'security policy' 624 dictates the permissions that the user has on the platform 10 while using an auxiliary smart card 17. For example, the user interface may be locked or unlocked while an auxiliary smart card 17 is in use, depending on the function of the auxiliary smart card 17. Additionally, or alternatively, certain files or executable programs on the platform 10 may be made accessible or not, depending on how trusted a particular auxiliary smart card 17 is. Further, the security policy 624 may specie a particular mode of operation for the auxiliary smart card 17, such as 'credit receipt' or 'temporary delegation', as will be described below.

A 'trust structure' 625 defines whether an auxiliary smart card 17 can itself 'introduce' further auxiliary smart cards 17 into the system without first re-using the logon smart card 19. In the embodiments described in detail here, the only defined trust is between the logon smart card 19 and the auxiliary smart cards 17 that can be introduced to the platform 10 by the logon smart card 19. Introduction may be 'single session' or 'multi-session', as will be descried below. However, there is no reason why certain auxiliary smart cards 17 could not in practice introduce further auxiliary smart cards 17. This would require an auxiliary smart card 17 to have an equivalent of a user profile listing the or each auxiliary smart card that it is able to introduce.

Further types of smart card suitable for use with a rusted device are described in the applicant's International Patent Application Publication No WO 00/54126, the contents of which are incorporated by reference herein.

A process for mutual authentication between the smart card 19 of FIG. 5 and the trusted platform 10 will be described with reference to FIG. 6. As will be described, the process conveniently implements a challenge/response routine. There exist many available challenge/response mechanisms. The implementation of an authentication protocol used in the present embodiment is mutual (or 3-step) authentication, as descried in ISO/IEC 9798-3. Of course, there is no reason why other authentication procedures coot be used, for example 2-step or 4-step, as also described in ISO/IEC 9798-3.

Initially, the user inserts their smart card 19 into the smart card reader 12 of the platform 10 in step 700. Beforehand, the platform 10 will typically be operating under the control of its standard operating system and executing the authentication process, which waits for a user to insert their smart card 19. Apart from the smart card reader 12 being active in this way, the platform 10 is typically rendered inaccessible to users by 'locking' the user interface (i.e. the screen, keyboard and mouse).

When the smart card 19 is inserted into the smart card reader 12, the trusted device 24 is triggered to attempt mutual authentication in step by generating and transmitting a nonce A to the logon smart card 19 in step 705. A nonce, such as a random number, is used to protect the originator from deception caused by replay of old but genuine responses (called a 'replay attack') by untrustworthy third parties.

In response, in step 710, the smart card 19 generates and returns a response comprising the concatenation of: the plain text of the nonce A, a new nonce B generated by the logon smart card 19, the ID 353 of the trusted device 24 and some redundancy, the signature of the plain text, generated by signing the plain text with the private key of the smart card 19; and a certificate containing the ID and the public key of the smart card 19.

The trusted device 24 authenticates the response by using the public key in the certificate to verify the signature of the plain text in step 715. If the response is not authentic, the process ends in step 720. If the response is authentic, in step 725 the trusted device 24 generates and sends a further response including the concatenation of: the plain text of the nonce A, the nonce B, the ID 627 of the smart card 19 and the acquired integrity metric; the signal of the plain text, generated by sighing the plan text using the private key of the trusted device 24; and the certificate comprising the public key of the trusted device 24 and the authentic integrity metric, both signed by the private key of the TP.

The smart card 19 authenticates this response by using the public key of the TP and comparing the acquired integrity metric with the authentic integrity metric, where a match indicates successful verification, in step 730. If the further response is not authentic, the process ends in step 735.

If the procedure is successful, both the trusted device 24 has authenticated the smart card 19 and the smart card 19 has verified the integrity of the trusted platform 10 and, in step 740, the authentication process executes the secure process for the user. Then, the authentication process sets an interval timer in step 745. Thereafter, using appropriate operating system interrupt routines, the authentication process services the interval timer periodically to detect when the timer meets or exceeds a predetermined timeout period in step 750.

Clearly, the authentication process and the interval timer run in parallel with the secure process.

When the timeout period is met or exceeded, the authentication process triggers the trusted device 24 to re-authenticate the smart card 19, by transmitting a challenge for the logon smart to identify itself in step 760. The smart card 19 returns a certificate including its ID 627 and its public key 628 in step 765. In step 770, if there is no response (for example, as a result of the smart card 19 having been removed) or the certificate is no longer valid for some reason (for example, the smart card has been replaced with a different smart card), the session is terminated by the trusted device 24 in step 775. Otherwise, in step 770, the process from step 745 repeats by resetting the interval timer.

Authentication of the smart card 19 by the trusted device 24 is not essential for general application of the present invention (but is advantageously employed in relevant embodiments). Aspects of the present invention do require that a security token such as smart card 19 validates the trusted device by obtaining validation information (such as the identity of the trusted device 24, the acquired integrity metric, or both—the last of these three options is assumed below) and conducting a validation process (such as comparing the acquired integrity metric with the authentic integrity metric verified by the TP).

A first embodiment of the present invention will now be described with reference to FIG. 7. FIG. 7 shows execution of a process on trusted computing platform 10 with a session between trusted device 24 and smart card 19 established. This process may be, for example, a secure process such as that shown in step 740 of FIG. 6.

At some point in the process, it is recognised that efficiency will be gained by transferring a secret in the smart card 19 to the trusted device 24. This may be at the beginning of a process in which it is known that multiple uses of the secret will be required, or in which it is known that one or more additional smart cards will be used, or may be later in the process when it has become clear that for these or other reasons, operational effectiveness will be enhanced by transferring the secret. At whatever stage is appropriate, the trusted device 24 requests (step 1000) the secret from the smart card 19—it is also possible that the request emanates from the trusted computing platform 10 rather than specifically the trusted device 24. This request may include some description of the purpose for which the secret is required. The smart card 19 has by this point both authenticated the trusted device 24 and confirmed that the identity and integrity metric are as expected. The smart card 19 then determines (step 1010) which, if any, conditions should be met by the trusted device 24 in using the secret. The secret is then provided (unless, for example, the purpose for use of the secret is unacceptable to the smart card 19, or of course if appropriate validation information, such as authentication information for the trusted device 24 or provision of a valid integrity metric, has not been provided by the trusted device 24) to the trusted device 24 (step 1020) with any conditions to be met in its use—such use parameters may include a time at which permitted use will expire, specific actions or purposes for which the secret can be used, or a more detailed scheme of use of the secret (for instance, a proposed course of a transaction process). The secret is then used (step 1030) in accordance with any conditions imposed. Preferably the secret is deleted (step 1040) after the relevant process has been completed, and confirmation is provided (step 1050) that this deletion has occurred.

Figure 8:
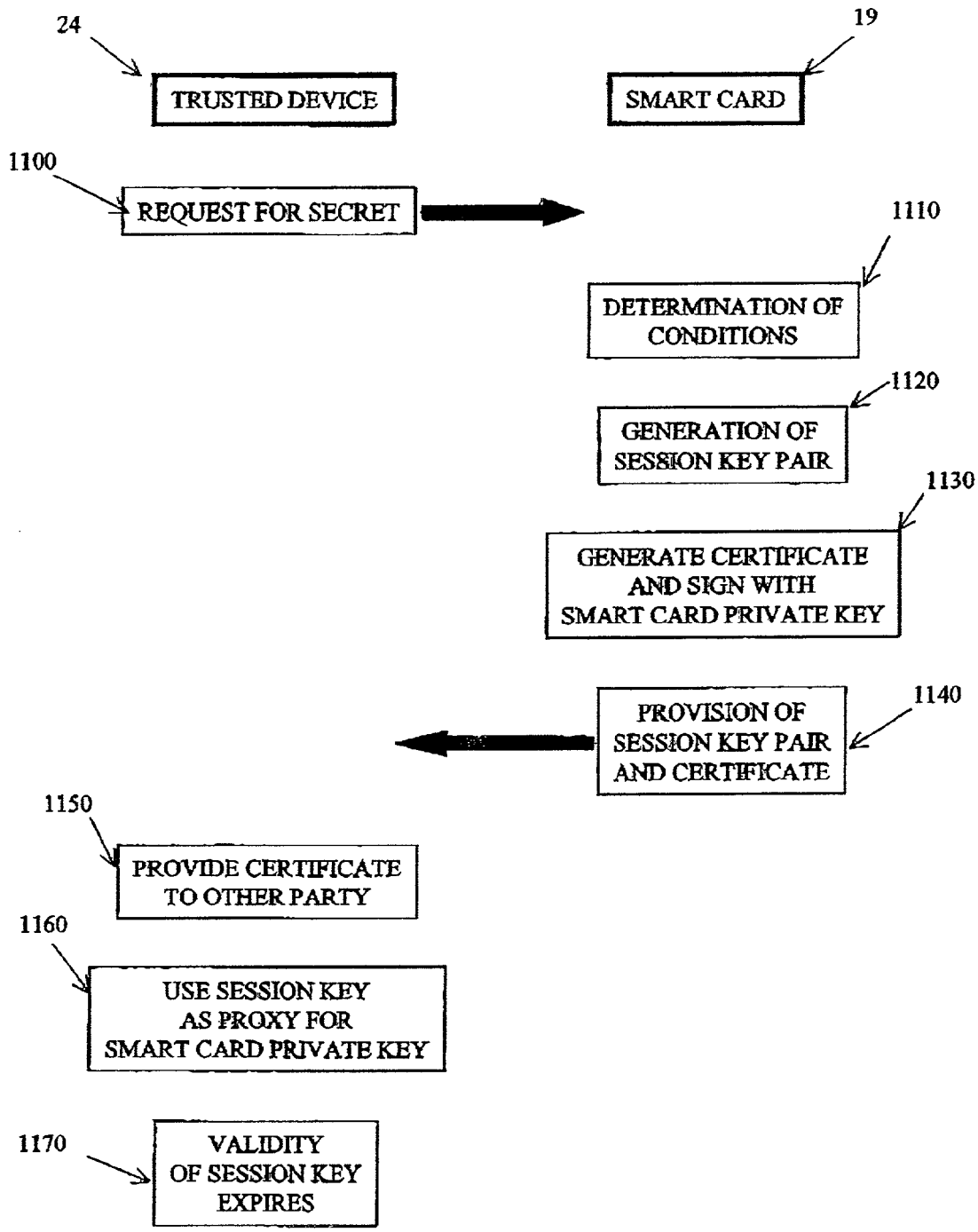
FIG. 8 is a diagram illustrates the provision of a secret by a smart card to the trusted device according to a second embodiment of the invention.

A second embodiment of the present invention is illustrated in FIG. 8. This indicates an alternative manner in which a smart card 19 may provide a secret to a trusted device 24. The mechanism is slightly more complex, and requires cryptographic capability (or access to cryptographic capability) in the smart card 19, but has the advantage that use of the secret can be controlled by the smart card 19 without reliance on compliance with conditions by the trusted device 24.

As before, the trusted device 24 requests (step 1100) a secret from the smart card 19. In this arrangement, the secret will typically be a private key of the smart card 19. As before, the request may include a statement of the proposed use of the secret, and the smart card may determine (step 1110) what conditions to place on use of the secret by the trusted device 24. The smart card 19 now uses its cryptographic capability to generate a session key pair (step 1120). The smart card also genes (step 1130) a certificate, signed with its relevant private key, for the session key pair. The certificate indicates that the session key maybe used as a proxy for the relevant smart card private key under the conditions determined in step 1110. The session key pair and the certificate are then provided to the trusted device 24 (step 1140). When the smart card private key is first required in the relevant process, the trued device 24 instead provides the certificate (step 1150) to the other party involved. The trusted device 24 then uses the session key (step 1160) as a proxy secret for the smart card private key throughout the process, with the other party accepting this use if it falls within the parameters indicated by the certificate. In due course, the validity of the session key will expire (step 1170), either through completion of the relevant task or purpose or through lapse of tie or both, so there is no need for it to be positively deleted. This arrangement relies less on the security provided by the trusted device 24, and it would be possible to use this approach either with an environment that is less secure than a preferred security level of trusted computing platform 10, or else with a processing and memory element less secure than trusted device 24.

Figure 6:
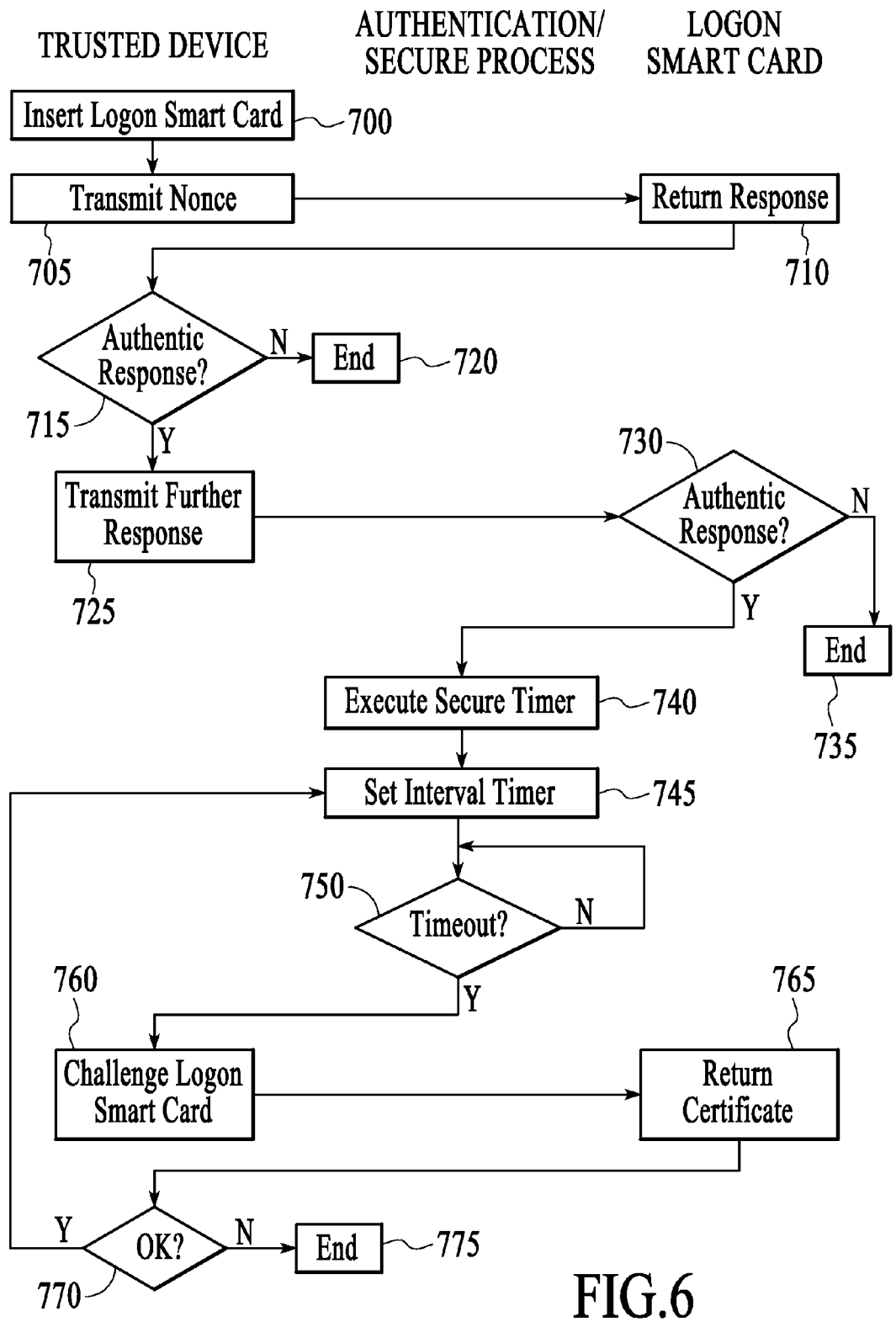
FIG. 6 is a diagram that illustrates a process of mutual authentication between the smart card of FIG. 5 and the trusted device.
Figure 7:
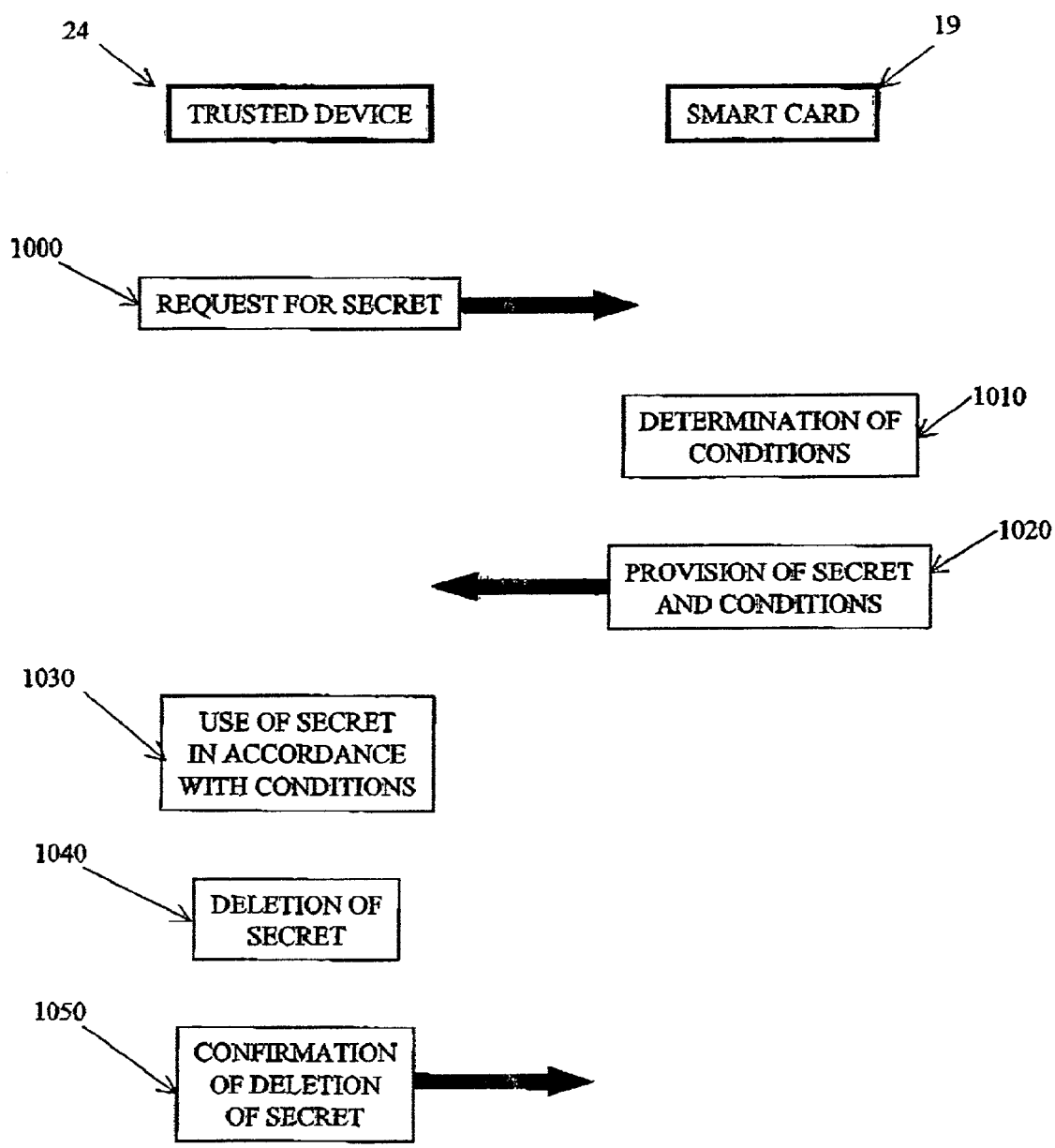
FIG. 7 is a diadem that illustrates the provision of a secret by a smart card to the trusted device according to a first embodiment of the invention.
Figure 9:
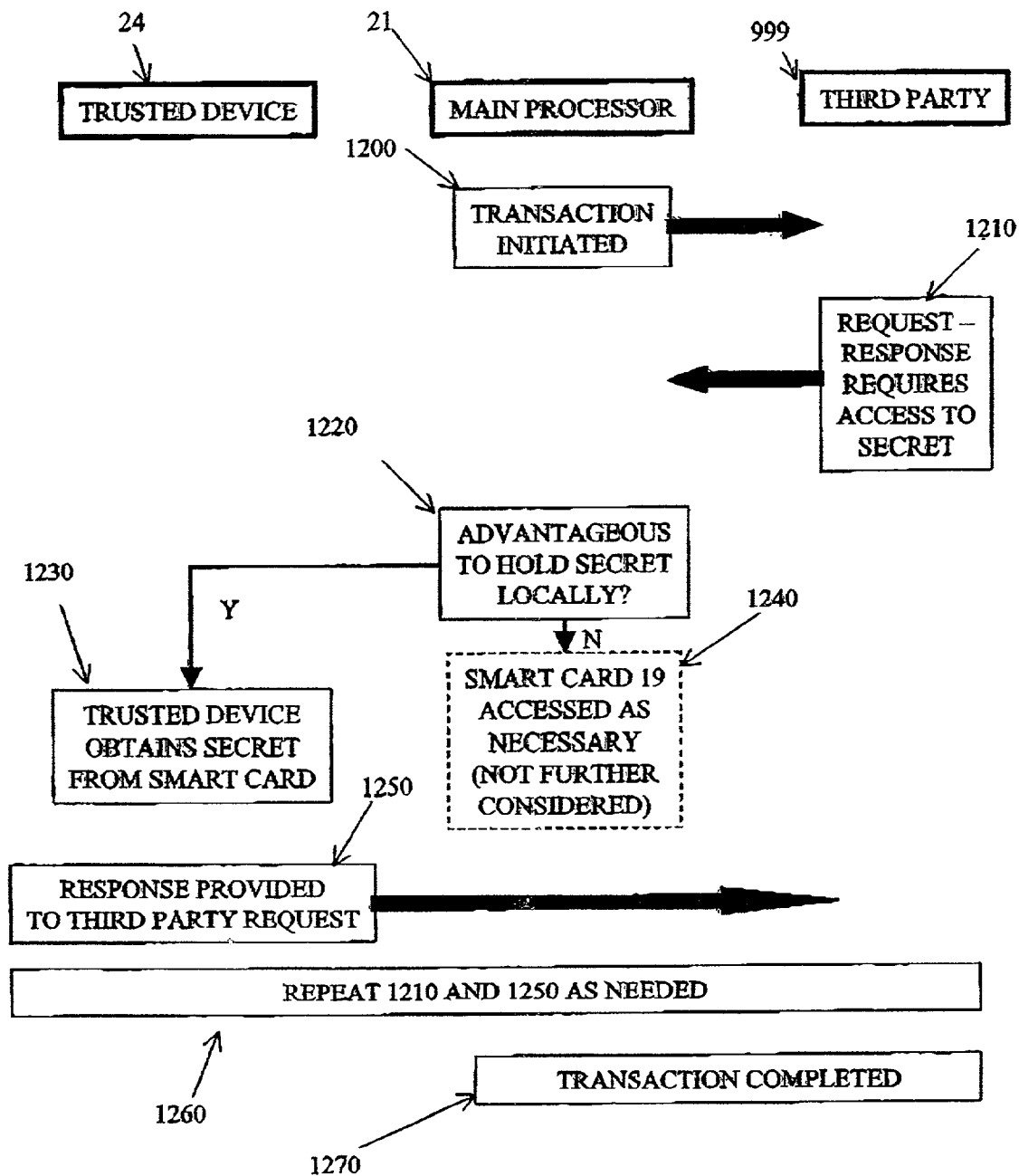
FIG. 9 is a diagram that illustrates use of embodiments of the invention in a transaction with a remote third party.
Figure 10:
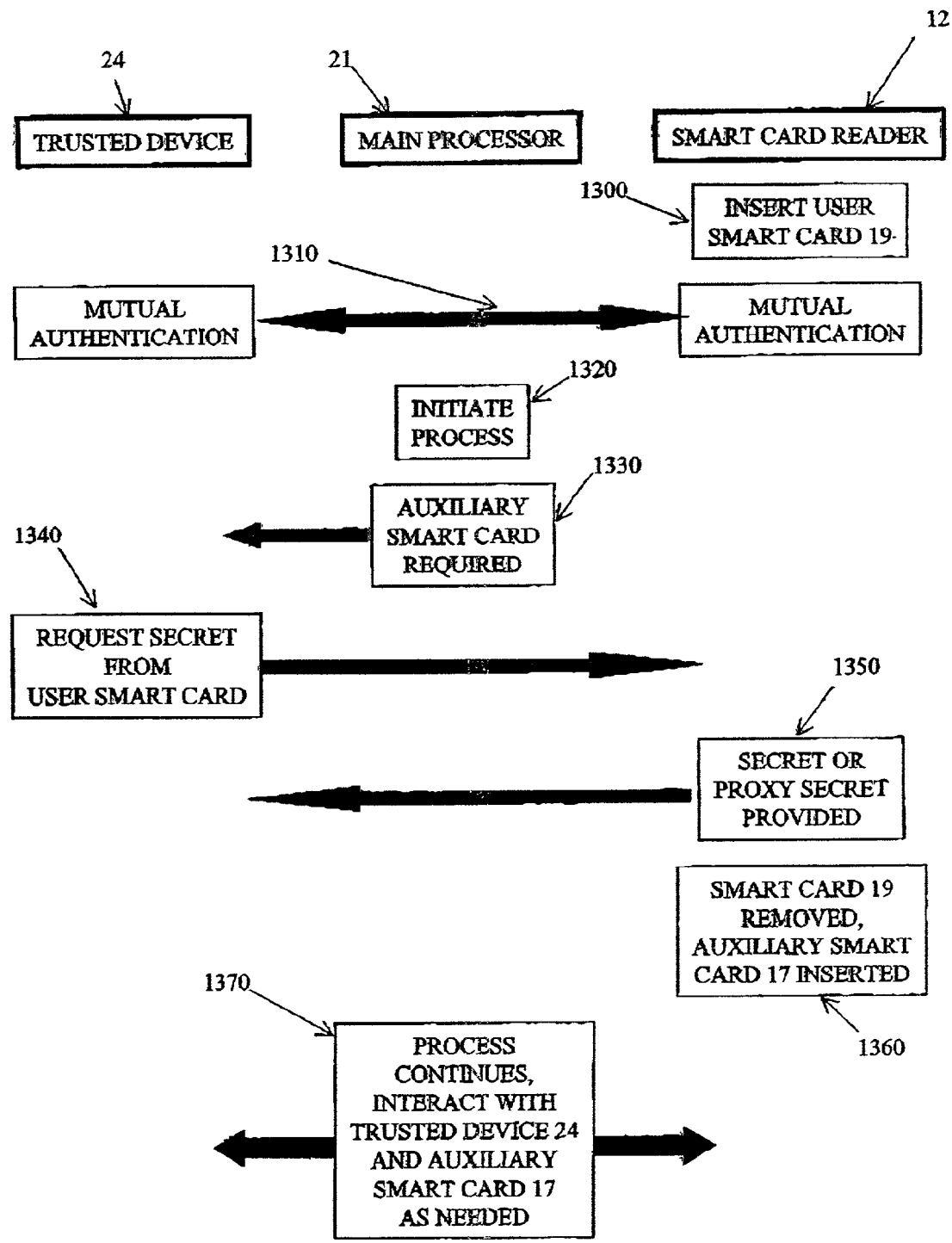
FIG. 10 is a diagram that illustrates use of embodiments of the invention in a process requiring the use of a plurality of smart cards.

In both the FIG. 7 and FIG. 8 arrangements it is desirable that communication between the smart card 19 and the trusted device 24 is secure. This can be achieved by using encrypted communication throughout. An alternative would be to use a physically isolated communication path between the two (in which case the smart card reader 12 would be connected to the trusted device 24 and not to any other processor or memory within the relevant computing environment). Both approaches could be employed together for greater security.

Where the smart card 19 is simply interacting with a local trusted computing platform 10, the arrangement of FIG. 6 may be generally sufficient and the embodiments of FIGS. 7 and 8 not required. In FIGS. 9 and 10, arrangements are briefly described in which the embodiments of FIGS. 7 and 8 may be effectively employed.

FIG. 9 illustrates an example of a transaction between a remote third party 999 and the user using the trusted computing platform 10. The transaction process runs on the maim processor 21 of the trusted commuting platform and is typically initiated by it (step 1200). At some point in the transaction process, the third party 999 makes a request (step 1210) to which a valid response can only be made by use of a secret held on the smart card 19. Either at this stage or at the start of the transaction process, the remain processor 21 determines (step 1220) whether it will be advantageous, or perhaps necessary, for the secret to be held locally in the trusted device 24 rather than in the smart card 19. Alternatively, the main processor 21 may offer the user the option of de mg whether it will be advantageous to do this (for example, if allowing the trusted device 24 to act as proxy for the smart card 19 would allow the smart card to be used for another purpose). If it is advantageous to hold the secret in the trusted device 24 to carry out the process effectively, the trusted device 24 obtains the secret (or a proxy secret) according to the process as indicated in FIG. 7 or FIG. 8 (step 1230). If it is determined not to be advantageous to hold the secret in the trusted device 24, access is instead made to the smart card 19 whenever necessary (step 1240)—this case is not considered further. Where the secret or a proxy secret has been transferred to the trusted device 24, the trusted device 24 can then provide the response required (step 1250) to the third party 999, or alternatively can provide the relevant part of the required response to the main processor 21 which then includes it into a complete response to the third party 999. Steps 1210 and 1250 can then be repeated (step 1260) as required (if there is no need for them to be repeated this process is unlikely to be justified). The transaction eventually completes (step 1270)—advantageously the secret is deleted from the trusted device 24 at this point, or the validity of a proxy secret expires. If the transaction does not complete successfully, again it is desirable for the trusted device 24 to delete the secret. A particularly secure arrangement is for the trusted device 24 to be aware of the expected course of the transaction—with this arrangement, if at any time the transaction process ceases to continue as expected the trusted device can abort the transaction process and delete the secret. A further possibility is for the smart card 19 to provide an indication of the expected course of the transaction in the use parameters that it provides to the trusted device 24—when the trusted device 24 is required to use the secret outside these use parameters, it maybe required not only not to use the secret in this manner but even to delete the secret.

FIG. 10 shows how the trusted device 24 can be used as a proxy for the smart card 19 when multiple smart cards are involved in a process (for example, a transaction in which payment is provided by an auxiliary smart card 17 which contains credits, or in which access to an auxiliary smart card 17 containing a user privilege is required). This issue is discussed in the applicant's International Patent Application Publication No. WO 00/54125, the contents of which are incorporated by reference herein, and the approach shown here is essentially an alternative to mechanisms there described. The skilled person will further appreciate how approaches described in WO 00/54125 may be modified to utilise aspects of the present invention in other manners than as explicitly described in FIG. 10.

FIG. 10 shows execution of a process on the trusted computing platform 10 under control of its main processor 21, the process requires use of the user smart card 19 and at least one auxiliary card 17 (it may also involve other auxiliary smart cards 17 and/or a remote third party 999 as shown in FIG. 9—it will be readily apparent how the FIG. 10 process could be extended to further auxiliary smart cards 17 or combined with the FIG. 9 process). Typically the smart card 19 will have been inserted into smart card reader 12 (step 1300) and mutual authentication between the smart card 19 and the trusted device 24 (step 1310) will have occurred before the relevant process is initiated (step 1320) by the main processor. When it becomes apparent that an auxiliary smart card will be required (possibly as soon as the process begins, possibly not until after this point), the main processor 21 indicates to the trusted device 24 (step 1330) that proxying of the relevant user smart card secret is required. The trusted device then requests the user smart card secret or a proxy using the approaches indicated in FIG. 7 or FIG. 8 (step 1340) and the secret or a proxy is provided by the user smart card (step 1350). The user smart card 19 can then be removed and the relevant auxiliary smart card 17 inserted (step 1360)—this maybe in accordance with a security policy 624 and a trust structure 625 in a user profile 621, but use of such user profiles is incidental to the present invention. The process then continues with the main processor 21 interacting with the trusted device 24 (as repository of the user smart card secret or proxy secret) and the auxiliary smart card 17 in the smart card reader. If multiple auxiliary smart cards are used, a further possibility is that an auxiliary smart card secret will also be transferred or proxied to the trusted device 24. As before, when the relevant process ends, a transferred secret in the trusted device 24 should be deleted, whereas a proxy secret will simply expire.

In the FIG. 10 arrangement, it can be noted that it would be desirable for the trusted device 24 to be able to proxy multiple secrets at any one time. In different arrangements, it may be desirable for the trusted device to proxy multiple secrets from a single smart cad, multiple secrets from a master smart card and auxiliary smart cards, or even multiple secrets from different security tokens for completely unrelated processes.

As indicated above, the present invention is not limited in application to smart cards (or other security tokens), which interact passively with a platform. The invention is applicable also to smart cards which can initiate a command to a platform (or trusted device on a platform), communicate with the trusted device for exchange of messages and information, send requests for information, and receive results from the trusted device in response to those requests. Implementation of initiation of user commands from a smart card is known in "Smartcards—from Security Tokens to Intelligent Adjuncts", by Boris Balacheff, Buno Van Wilder and David Chan, published in CARDIS 1998 Proceedings.

Aspects of the present invention may involve one trusted device (or other trusted entity) using the secret of, or acting as a proxy for, a second trusted entity. Essentially the same preferred process steps as indicated above will apply (mutual authentication of the two trusted entities followed by communication of the secret and use parameters from one trusted entity to the other), but the circumstances in which this aspect arc employed are likely to be different. One possibility is for the trusted device of a user trusted platform to be proxied to the trusted device (or a trusted process) operating on a trusted server. Another possibility is for a user to proxy a trusted device from a portable computing platform (such as a PDA, mobile phone or notebook computer) to a fixed platform with, for example, a high bandwidth connection to a transaction server.

Similarly, the interpretation of integrity measurements provided by the trusted device may not be achieved by the user, as represented by a smart card or otherwise. An appropriate solution is for a user smart card to have access (typically trough the platform) to a trusted third party server which provides this functionality. This can be an advantageous solution because of the limited processing power and memory available on most smart cards. In this arrangement, the integrity metrics data is sent not to the at card but to a remote server trusted by the smart card. The remote server verifies that the integrity metrics data provided by the trusted device is correct by comparing it with a set of expected integrity metrics. The expected integrity metrics may be supplied by the trusted device itself from pre-stored data within it, or where the platform is of a common type, the trusted server may store sets of expected integrity metrics for that type of computer platform. In either case, the trusted server performs the heavy computational data processing required for verification of the integrity metrics with the expected integrity metrics, and digitally signs the result of the verification. This is sent back to the smart card, which then may either accept or reject the digital signature, and hence the verification result.

While the invention has been described with reference to several preferred embodiments, it will be appreciated that various modifications can be made to the parts and methods that comprise the invention without departing from the spirit and scope thereof.

The invention claimed is:

1. Computing system comprising:
    a token reader;
    a trusted device which is physically and logically protected from unauthorized modification, the trusted device having therein a device memory, and a device interface adapted for communication with the token reader; and
    a security token having therein a token processor and a token memory;
    wherein validation information is stored in the device memory and a secret is stored in the token memory, and whereby on provision of validation information from the device memory to the token memory, and satisfactory completion of a validation process by the token processor, the security token is adapted to provide the secret to the device memory.

2. Computing system as claimed in claim 1, wherein on receipt of the secret the trusted device is adapted to act as a proxy for the security token.

3. Computing system as claimed in claim 2, wherein the trusted device is adapted to act as a proxy for a plurality of security tokens.

4. Computing system as claimed in claim 1, wherein the trusted device is permitted to use the secret only within specified use parameters.

5. Computing system as claimed in claim 4, wherein said specified use parameters comprise a specified time.

6. Computing system as claimed in claim 4, wherein said specified use parameters comprise a specified purpose.

7. Computing system as claimed in claim 4, wherein said specified use parameters are specified by the security token.

8. Computing system as claimed in claim 4, wherein the trusted device is adapted to delete the secret once the specified use parameters can no longer be achieved.

9. Computing system as claimed in claim 1, wherein the validation information comprises an identity of the trusted device, and wherein the validation process comprises authentication of the identity.

10. Computing system as claimed in claim 1, wherein the trusted device comprises a device processor.

11. Computing system as claimed in claim 10, wherein the computing system comprises a computing environment having a main processor and a main memory, both adapted to communicate with the trusted device, and wherein the device processor runs a process to obtain an integrity metric of the computing environment, the validation information comprising the integrity metric.

12. Computing system as claimed in claim 1, wherein the security token has a private key.

13. Computing system as claimed in claim 12, wherein the secret is the private key.

14. Computing system as claimed in claim 12, wherein the security token is adapted to generate a session key pair and a certificate certifying the session key pair with the private key, and wherein the secret is the session key pair.

15. Computing system as claimed in claim 14, wherein the certificate indicates use parameters for which the session key pair is valid.

16. Computing system as claimed in claim 1, further comprising a trusted communication channel between the trusted device and the security token.

17. Computing system as claimed in claim 16, wherein said trusted communication channel is an isolated hardware path.

18. Computing system as claimed in claim 16, wherein said trusted communication channel is achieved by encryption of communications.

19. Computing system as claimed in claim 1, wherein the security token is a smart card, and the token reader is a smart card reader.

20. Computing system as claimed in claim 1, wherein the computing system is a computing platform having a main processor and a main memory, wherein the trusted device is mounted on a common assembly with the main processor and the main memory and is adapted to communicate with both, and wherein the trusted device comprises a device processor.

21. A method of using in a distributed computing system a secret stored on a security token, the method comprising:
    the security token obtaining validation information from a trusted entity within the distributed computing system, the trusted entity being logically and physically protected from unauthorized modification;
    the security token executing a validation process on the validation information, wherein if said validation process is successful;
    the security token provides the secret to the trusted entity for use within the distributed computing system.

22. A method as claimed in claim 21, further comprising: on receipt of the secret, the trusted entity acting as a proxy for the security token.

23. A method as claimed in claim 21, wherein the trusted entity is permitted by the security token to use the secret only within specified use parameters.

24. A method as claimed in claim 23, wherein the specified use parameters comprise a specified time.

25. A method as claimed in claim 23, wherein the specified use parameters comprise a specified purpose.

26. A method as claimed in claim 21, wherein the trusted entity is a trusted device physically and logically protected from unauthorized modification and the secret is provided to the trusted device entity.

27. A method as claimed in claim 26, further comprising deletion of the secret from the trusted device entity.

28. A method as claimed in claim 27, wherein said deletion occurs after elapse of a specified time.

29. A method as claimed in claim 28, wherein said deletion occurs if a process involving use of the secret does not execute in an expected manner.

30. A method as claimed in claim 27, wherein said deletion occurs after completion of a specified task.

31. A method as claimed in claim 21, wherein the trusted entity is a trusted process logically protected from unauthorized modification and located within hardware physically protected from unauthorized modification.

32. A method as claimed in claim 21, wherein the validation information comprises an identity of the trusted entity, and the validation process comprises authentication of the identity.

33. A method as claimed in claim 21, wherein the validation information comprises a measurement of integrity of a competing environment within which the trusted entity is located.

34. A method as claimed in claim 21, wherein provision of the secret comprises generation of a session key pair and a certificate certifying the session key pair with a private key, and provision of the session key pair to the trusted entity as the secret.

35. A method as claimed in claim 34, wherein the certificate indicates a duration or a purpose for which the session key pair is valid.

36. A computing apparatus adapted for temporary use of a received secret, comprising:
 a computing environment comprising a main processor and a main memory;
 a trusted entity physically and logically protected from unauthorized modification, the trusted device being adapted to determine an integrity metric of the computing environment; and
 a token reader in communication with the trusted entity;
 wherein the trusted entity is adapted to communicate with a security token through the token reader, to provide the integrity metric to the security token, to receive, upon satisfactory completion of a validation process by the security token, a secret from the security token, and to use the secret as prescribed by the security token.

37. Computing apparatus as claimed in claim 36, wherein the token reader is a smart card reader.

38. Computing apparatus as claimed in claim 36, wherein the trusted entity is a trusted device physically and logically protected from unauthorized modification and the secret is provided to the trusted device memory.

39. Computing apparatus as claimed in claim 36, wherein the trusted entity is a trusted process logically protected from unauthorized modification and located within hardware physically protected from unauthorized modification.

40. Computing system comprising:
 a first trusted entity which is physically and logically protected from unauthorized modification;
 a second trusted entity which is physically and logically protected from unauthorized modification;
 a communications channel between the first trusted entity and the second trusted entity;
 wherein validation information is held by the first trusted entity and a secret is held by the second trusted entity, and whereby on provision of validation information from the first trusted entity to the second trusted entity, and satisfactory completion of a validation process by the second trusted entity, the second trusted entity is adapted to provide the secret to the first trusted entity.

41. A computing system as claimed in claim 40 wherein the first trusted entity is adapted to act as proxy for the first trusted entity.

42. A computing system as claimed in claim 40 wherein one or both of the first trusted entity and the second trusted entity is a trusted device physically and logically protected from unauthorized modification and the secret is provided to the trusted device.

43. A computing system as claimed in claim 40 wherein one or both of the first trusted entity and the second trusted entity is a trusted process logically protected from unauthorized modification and located within hardware physically protected from unauthorized modification.

44. A computing system as claimed in claim 40 wherein the second trusted entity is permitted to use the secret only in accordance with use parameters specified by the first trusted entity.

45. A computing system as claimed in claim 40 wherein said validation information comprises an identity of the first trusted entity.

46. A computing system as claimed in claim 40, wherein said secret comprises a private key of the second trusted entity.

47. A computing system as claimed in claim 40, wherein said secret comprises a session key pair generated from a private key of the second trusted entity.

48. A method of using a secret in a distributed computer system, the method comprising:
 a first trusted entity within the distributed computing system providing validation information to a second trusted entity within the distributed computing system, each said trusted entity being logically and physically protected from unauthorized modification;
 the second trusted entity executing a validation process on the validation information, wherein if said validation process is successful;
 the second trusted entity provides the secret to the first trusted entity for use within the distributed computing system.

* * * * *

UNITED STATES PATENT AND TRADEMARK OFFICE
CERTIFICATE OF CORRECTION

PATENT NO.        : 7,779,267 B2                                                   Page 1 of 1
APPLICATION NO.   : 09/946323
DATED             : August 17, 2010
INVENTOR(S)       : Liqun Chen et al.

It is certified that error appears in the above-identified patent and that said Letters Patent is hereby corrected as shown below:

Column 8, line 22, before "platform" insert -- trusted --.

Column 10, line 38, after "trust" insert -- structure --.

Column 15, line 66, in Claim 2, delete "secret" and insert -- secret, --, therefor.

Signed and Sealed this
Twenty-eighth Day of December, 2010

David J. Kappos
*Director of the United States Patent and Trademark Office*